United States Patent
Russel et al.

(10) Patent No.: US 9,344,837 B2
(45) Date of Patent: May 17, 2016

(54) METHODS AND DEVICES FOR PATH-LOSS ESTIMATION

(71) Applicant: Google Technology Holdings LLC, Mountain View, CA (US)

(72) Inventors: Michael E Russel, Lake Zurich, IL (US); Thomas E Gitzinger, Libertyville, IL (US)

(73) Assignee: Google Technology Holdings LLC, Mountain View, CA (US)

(*) Notice: Subject to any disclaimer, the term of this patent is extended or adjusted under 35 U.S.C. 154(b) by 87 days.

(21) Appl. No.: 14/052,903

(22) Filed: Oct. 14, 2013

(65) Prior Publication Data

US 2015/0105029 A1    Apr. 16, 2015

(51) Int. Cl.
*H04B 17/00* (2015.01)
*H04W 4/00* (2009.01)
*H04W 4/02* (2009.01)

(52) U.S. Cl.
CPC .............. *H04W 4/008* (2013.01); *H04W 4/023* (2013.01)

(58) Field of Classification Search
CPC ........................... H04W 24/00; H04B 17/0042
USPC ............................................ 455/67.11, 67.13
See application file for complete search history.

(56) References Cited

U.S. PATENT DOCUMENTS

| | | | | |
|---|---|---|---|---|
| 7,199,754 B2* | 4/2007 | Krumm | ................. | G01C 21/206 342/451 |
| 8,094,011 B2* | 1/2012 | Faris | ....................... | G08B 21/24 340/539.13 |
| 2005/0136845 A1* | 6/2005 | Masuoka | ............... | G01S 5/0294 455/67.14 |
| 2005/0208952 A1 | 9/2005 | Dietrich et al. | | |
| 2010/0159833 A1 | 6/2010 | Lewis et al. | | |
| 2011/0148625 A1* | 6/2011 | Velusamy | .......... | G08B 13/1427 340/539.13 |
| 2012/0182144 A1 | 7/2012 | Richardson et al. | | |
| 2012/0309413 A1 | 12/2012 | Grosman et al. | | |
| 2013/0040578 A1* | 2/2013 | Khoshnevis | ........ | H04W 52/242 455/67.11 |
| 2013/0059600 A1* | 3/2013 | Elsom-Cook | ............. | G01S 3/20 455/456.1 |
| 2013/0142113 A1* | 6/2013 | Fong | ........................ | H04W 4/06 370/328 |
| 2013/0310102 A1* | 11/2013 | Chao | .................... | H04W 52/146 455/522 |
| 2013/0322375 A1* | 12/2013 | Chang | ............... | H04W 72/0426 370/329 |

FOREIGN PATENT DOCUMENTS

| | | |
|---|---|---|
| EP | 2557433 A1 | 2/2013 |
| WO | WO 2008/112849 A2 | 9/2008 |

OTHER PUBLICATIONS

European Patent Office, International Search Report and the Written Opinion in International Patent Application PCT/US2014/060440 (Feb. 5, 2015).

* cited by examiner

*Primary Examiner* — April G Gonzales
(74) *Attorney, Agent, or Firm* — Wolfe-SBMC

(57) ABSTRACT

A method on a first device for estimating path-loss between the first device and a second device is described. A user context indicator associated with the first device is determined. At least one path-loss parameter of a plurality of path-loss parameters for the first device is updated based on the user context indicator. At least one wireless signal is received from the second device. The path-loss between the first device and the second device is estimated based on the plurality of path-loss parameters and the at least one wireless signal.

21 Claims, 7 Drawing Sheets

600

700

METHODS AND DEVICES FOR PATH-LOSS ESTIMATION

TECHNICAL FIELD

The present disclosure is related generally to wireless device communication and, more particularly, to estimation of path-loss between wireless devices.

BACKGROUND

Electronic devices, such as smartphones and tablets are often used in combination with wearable electronic devices, such as wireless headsets or watches. For example, a user may have a smartphone and a watch that are communicatively linked or "paired" to each other via Bluetooth or other wireless communication technologies. A wireless communication link between the smartphone and watch allows for exchanging data between them, but also for estimating their proximity. The smartphone (or watch) may be configured to alert the user when the distance to the paired device reaches a predetermined threshold to prevent the user from leaving the paired device behind, prevent moving the device without the user's knowledge (e.g., being stolen), or to lock either device to prevent unauthorized access when out of range.

The smartphone may estimate a distance between itself and the watch based on a signal strength of a wireless signal received from the watch; however, various factors affect the received signal strength independently from the actual distance. Environmental factors, such as moving between rooms in a house or office building, can increase interference and reduce the received signal strength as the wireless signal must travel through walls and other materials. Moving from an indoor location to an outdoor location can also reduce received signal strength due to fewer multipath signal reflections. Variations in received signal strength caused by environmental factors can cause the smartphone to alert the user, based on the received signal strength, when the actual distance between the smartphone and the watch is within an acceptable range.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
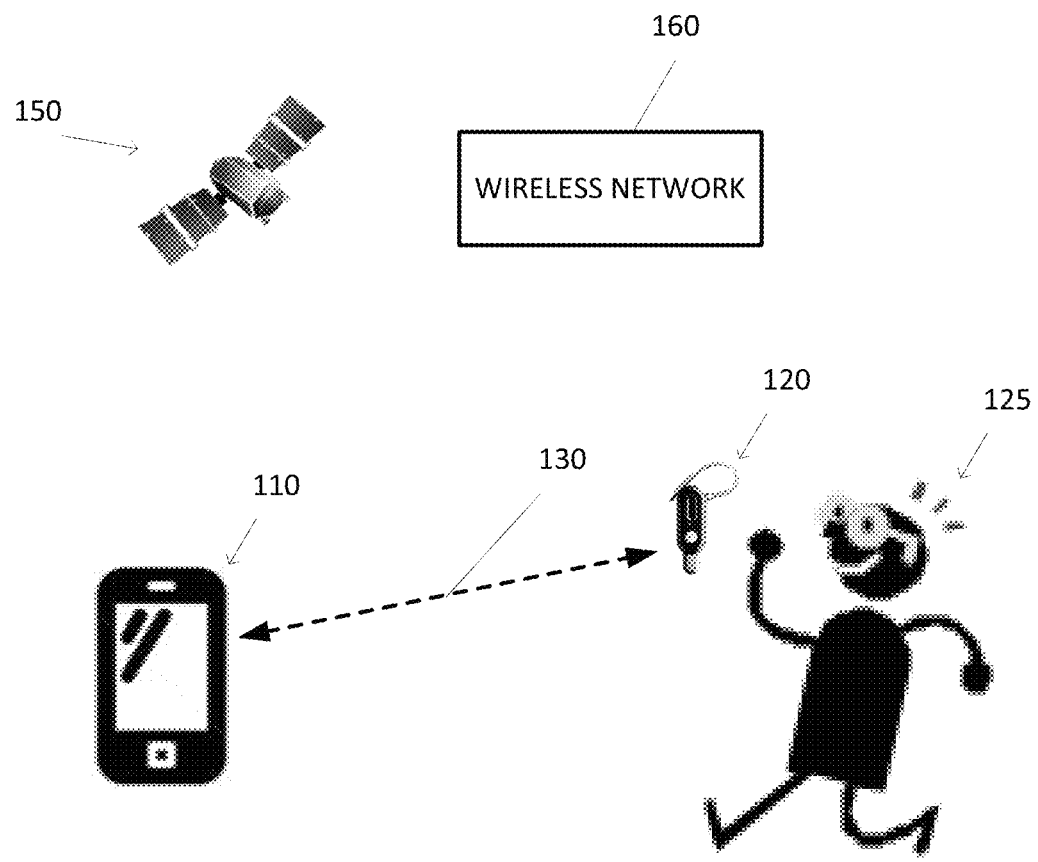
FIG. 1 is an overview of a representative communication system in which the methods of this disclosure may be practiced.

Turning to the drawings, wherein like reference numerals refer to like elements, the following description is based on embodiments of the claims and should not be taken as limiting the claims with regard to alternative embodiments that are not explicitly described herein.

The various embodiments described herein allow a smartphone or other electronic device to reduce false proximity alerts by compensating for environmental factors, for example, by adjusting variables related to the environmental factors when determining the path-loss. Further reductions are possible if the smartphone adjusts an alert threshold for providing an alert. The alert threshold in one example is a distance or a path-loss value that corresponds to a distance. In one example, the smartphone uses a higher alert threshold that allows a user in their home to move between rooms (e.g., up to 10 meters or more) without receiving an alert. In another example, the smartphone uses a shorter alert threshold (up to 2 meters) when the user is in a public place or traveling between locations. The smartphone may also adjust a monitor interval of the proximity determination in order to reduce battery drain. For example, the smartphone uses a higher monitor interval (e.g., five seconds) when in the user's home but a lower monitor interval (e.g., one second) when in a public place or traveling. The smartphone may also change the alert type performed when the alert threshold has been met.

The variables for environmental factors, alert threshold, monitor interval, and alert type are parameters for estimation of the path-loss or the response to the path loss that may be generally related to a user context. Examples of user context include a location and movement history of the smartphone, along with calendar information for the user (e.g., stored in or accessible from the smartphone). In one example, a user's smartphone is paired with the user's smart watch. The smartphone compensates for "indoor" environmental factors by adjusting a path-loss exponent for path-loss estimation, uses a higher alert threshold, and uses a longer monitor interval when the user is located in their home. This allows the user to walk around their home without unnecessary alerts. The smartphone can adjust the alert threshold (e.g., a distance to the smart watch) and monitor interval when an appointment in the calendar approaches. For example, if prior movement history indicates that the user typically leaves their home 20 minutes before a scheduled appointment, the smartphone reduces the alert threshold and reduces the monitor interval 25 minutes before the scheduled appointment so that the user is less likely to leave without the smartphone.

In one embodiment, a smartphone determines a user context indicator, such as a current location or movement history. The smartphone updates path-loss parameters based on those user context indicators and then determines the path-loss to another electronic device, such as a smart watch.

Turning to FIG. 1, a pair of electronic devices 110 and 120 is shown. Possible implementations of the electronic devices 110 and 120 include a smartphone, tablet, wireless wristwatch (e.g., a "smart watch"), wireless headset, laptop or personal computer, key fob, wireless-enabled glasses, or other wireless communication enabled device. As shown in the example of FIG. 1, the electronic device 110 is a smartphone and the electronic device 120 is a wireless headset of a user 125. One or more of the electronic devices 110 or 120 may be configured to receive communications from a satellite-based positioning system 150 or a wireless network 160. Examples of the satellite-based positioning system 130 include the global positioning system ("GPS"), Globalnaya Navigatsionnaya Sputnikovaya Sistema ("GLONASS"), BeiDou Navigation Satellite System, Galileo navigation system, and Indian Regional Navigational Satellite System. Possible implementations of the wireless network 160 include a cellular network, Institute of Electrical and Electronics Engineers ("IEEE") 802.11 network, or other wireless communication network.

Figure 2:
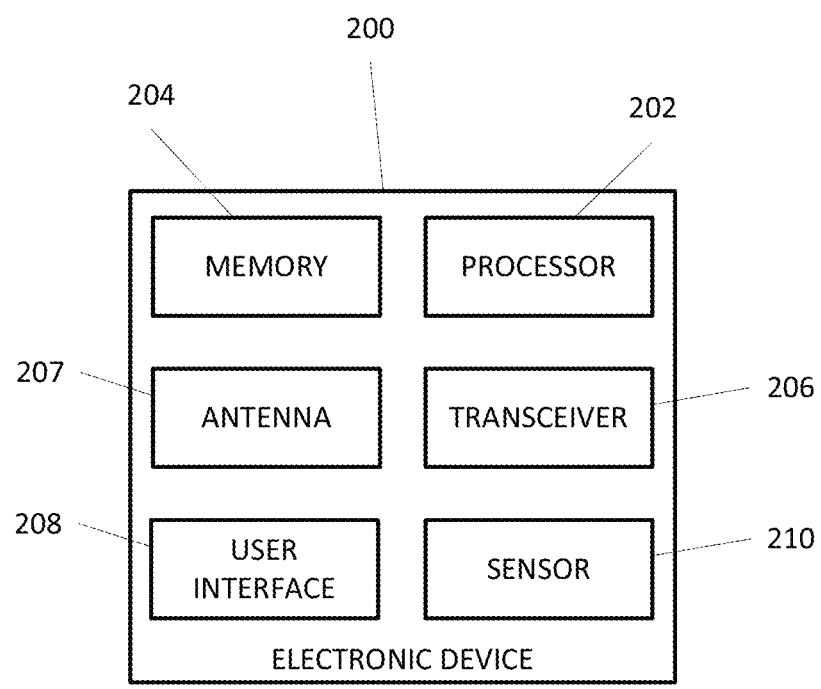
FIG. 2 is a simplified block diagram of a representative electronic device.

Turning to FIG. 2, a simplified block diagram illustrates an embodiment of an electronic device 200. The electronic device 200 in one example implements one or more of the electronic devices 110 or 120. As shown in FIG. 2, the electronic device 200 includes a processor 202 that executes stored programs. The electronic device 200 further includes a memory 204. The processor 202 writes data to and reads data from the memory 204. The electronic device 200 also includes a transceiver 206 and antenna 207 configured for sending and receiving data, for example, over a wireless network (e.g., the wireless network 160 of FIG. 1) or with other electronic devices (e.g., via a wireless communication link). In a further example, the transceiver 206 and antenna 207 are configured for receiving communications from a satellite-based positioning system (e.g., the satellite-based positioning system 150 of FIG. 1). In some embodiments, the electronic device 200 has a user input interface 208 that may include one or more of a keypad, display screen, touch screen, or the like. In some embodiments, the electronic device 200 includes one or more sensors 210. Possible implementations of the sensors 210 include a gyroscope, accelerometer, ambient light sensor, temperature sensor, microphone, barometer, or proximity sensor. In alternative implementations, various components of the electronic device 200 may be combined or divided. For example, the transceiver 206 or antenna 207 may be separated into a plurality of components for separately handling GPS, Bluetooth, 802.11, and cellular communications. Alternatively, the transceiver 206 may be configured as a combined transceiver for multiple wireless communication protocols or links.

Referring again to FIG. 1, the electronic devices 110 and 120 are configured to establish a wireless communication link 130 between each other. Possible implementations of the wireless communication link 130 include a Bluetooth link, IEEE 802.11 link, IEEE 802.15 link, or other radio frequency ("RF") communication link. For a Bluetooth link, the electronic devices 110 and 120 may implement the Proximity Profile as defined in Bluetooth Specification PXP_SPEC (available from https://www.bluetooth.org/en-us/specification/adopted-specifications). In this case, the electronic device 110 implements the proximity monitor role while the electronic device 120 implements the proximity reporter role. In other examples, the roles are reversed between the electronic devices 110 and 120 or additional roles may be implemented.

To aid in the clarity of the description, each device will be referred to by the role that it plays with respect to a Bluetooth implementation while carrying out the methods set forth in this disclosure. More specifically, the first device will be referred to as the monitoring device 110 (e.g., a smartphone) while the second device will be referred to as the reporting device 120 (e.g., a headset). In practice, however, either device could act as a monitoring device or as a reporting device. In other words, the generic term "first device" can refer to either a monitoring device or a reporting device. Likewise, the generic term "second device" can refer to either a monitoring device or a reporting device. Additionally, the methods may be practiced with other RF communication technologies.

The monitoring device 110 is configured to estimate path-loss on the wireless communication link 130 with the reporting device 120 using a plurality of path-loss parameters. For simplicity, only a path-loss exponent, an alert threshold, and a monitor interval are described herein, but other path-loss parameters (e.g., transmit power, wavelength, and gain) will be apparent to those skilled in the art. The monitoring device 110 is configured to determine one or more user context indicators and to update one or more of the path-loss parameters based on the user context indicators. The monitoring device 110 then estimates the path-loss on the wireless communication link 130 using the updated path-loss parameters.

For determination of the user context indicator, the monitoring device 110 in one example uses an output from one or more sensors (e.g., sensors 210 of FIG. 2), data received from a remote device (e.g., via transceiver 206 of FIG. 2), or data stored in the monitoring device 110. The user context indicator may be a raw signal output from a sensor or a processed output from a single sensor or multiple sensors. In one example, the monitoring device 110 determines that the user 125 is driving based on a movement speed and a location obtained based on signals from the satellite-based positioning system 150 (e.g., moving above 40 miles per hour and located on an expressway). In another example, the monitoring device 110 may determine that the user is located in their home, at work, in a shopping mall, or at a park, for example, based on the location from the satellite-based positioning system 150.

In yet another example, the monitoring device 110 may determine the location, movement speed, or movement type based on detection of or proximity to a stationary Wi-Fi network (e.g., based on received signal strength or a change in received signal strength) such as the wireless network 160 (e.g., a fixed Wi-Fi network located at the user's home or place of work). In another example, the monitoring device 110 compares a received signal strength for the wireless network 160 with a received signal strength from the reporting device 120 for the same wireless network 160. In this case, if a first received signal strength, between the monitoring device 110 and the wireless network 160, and a second received signal strength, between the reporting device 120 and the wireless network 160, have not changed while the received signal strength between the monitoring device 110 and reporting device 120 has changed, the monitoring device 110 may determine that the user is changing orientation of the devices 110 and 120, rather than their actual proximity being changed (i.e., relative movement between the devices 110 and 120).

In other examples, the user context indicator may be data or information, such as an appointment entry in a calendar on the monitoring device 110. In yet another example, the monitoring device 110 obtains a user context indicator from the reporting device 120 or another remote electronic device such as a calendar or e-mail information server (e.g., via the wireless network 160 or another wireless communication link). Accordingly, the user context indicator may be associated with the monitoring device 110, the reporting device 120, or another device (not shown).

The user context indicator corresponds to at least one parameter adjustment for a path-loss parameter. The parameter adjustments may be an increase, reduction, an indication to reset the parameter, or an indication to set the parameter to a specific value. Examples of the user context indicator include a current location of the monitoring device 110, a movement speed associated with the monitoring device 110, a movement type associated with the monitoring device 110, an orientation of the monitoring device 110, a movement history associated with the monitoring device 110, a state indicator for the monitoring device 110, sensor data of the monitoring device 110, a user profile associated with the monitoring device 110, calendar information associated with the monitoring device 110, detection status or path-loss for another device (not shown) or a stationary wireless network 160, received signal strength of a stationary wireless network 160, or a current proximity between the monitoring device 110 and reporting device 120.

In a further example, the monitoring device 110 receives one or more user context indicators from the reporting device 120 (e.g., via the wireless communication link 130). The user context indicators from the reporting device 120 may be the same or different (e.g., movement speed of the reporting device 120, orientation of the reporting device 120, received signal strength, etc.). Accordingly, the monitoring device 110 may use user context indicators from both the monitoring device 110 and the reporting device 120 to update the path-loss parameters.

In another example, the user context indicator is a status indicator that indicates an activity or movement type in which the user 125 is engaged, such as driving, walking, running, bicycling, sleeping, or talking in a conversation. The status indicator in one example represents a level of attention which the user 125 may have available to keep track of the monitoring device 110. For example, if the user 125 is in a conversation or interacting with another electronic device (such as a tablet), the user 125 is likely to be distracted and thus less likely to notice that they have departed without the monitoring device 110 or that the monitoring device 110 has been moved away from them. In yet another example, the status indicator may indicate how quickly the user 125 could be separate from the reporting device 120. For example, if the user 125 is running or moving quickly, they may prefer to be alerted more readily (e.g., with a lower monitor interval or lower alert threshold).

Figure 3:
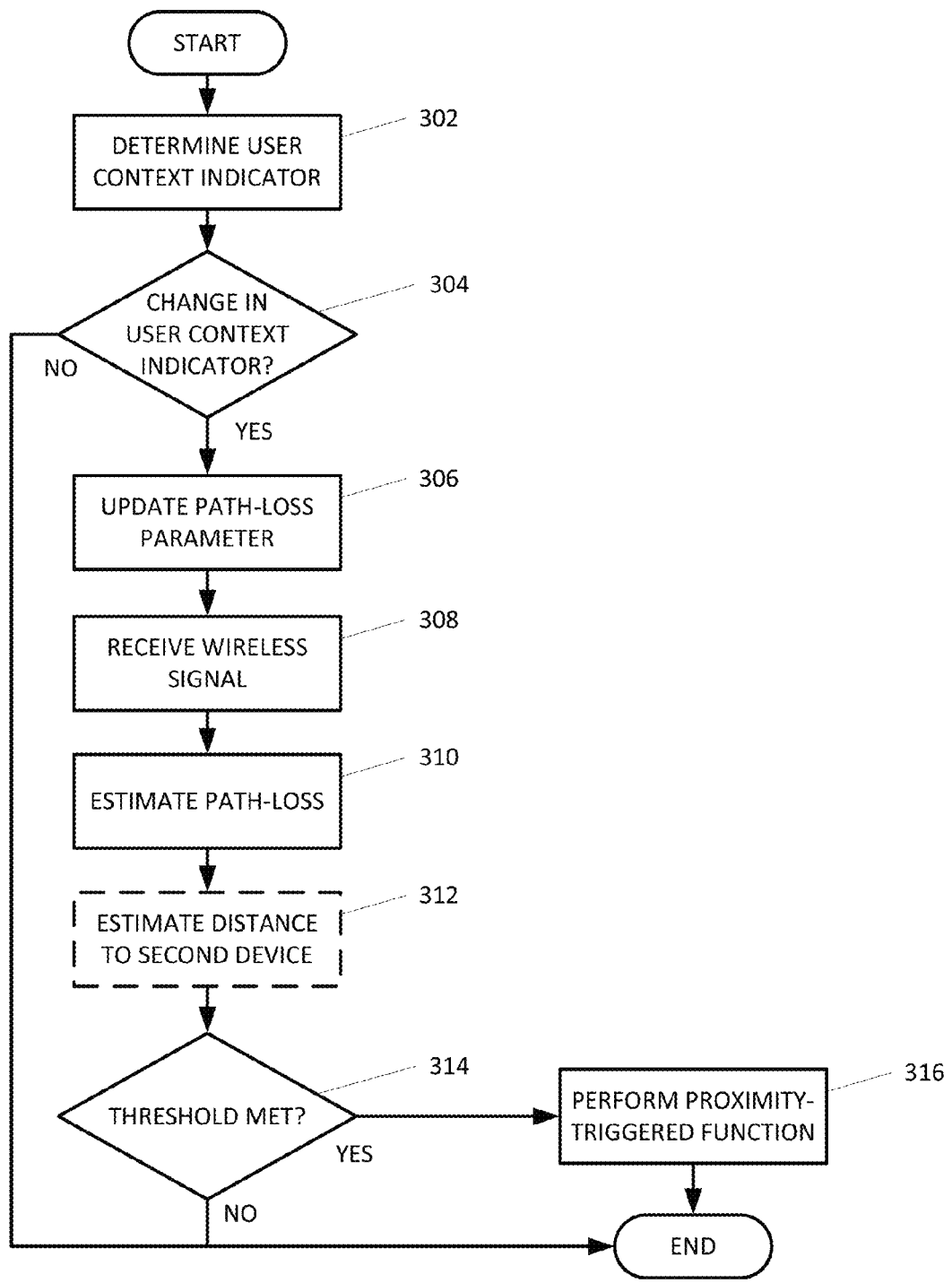
FIG. 3 is a process flow of a method in an electronic device of FIG. 1, according to an embodiment.
Figure 4:
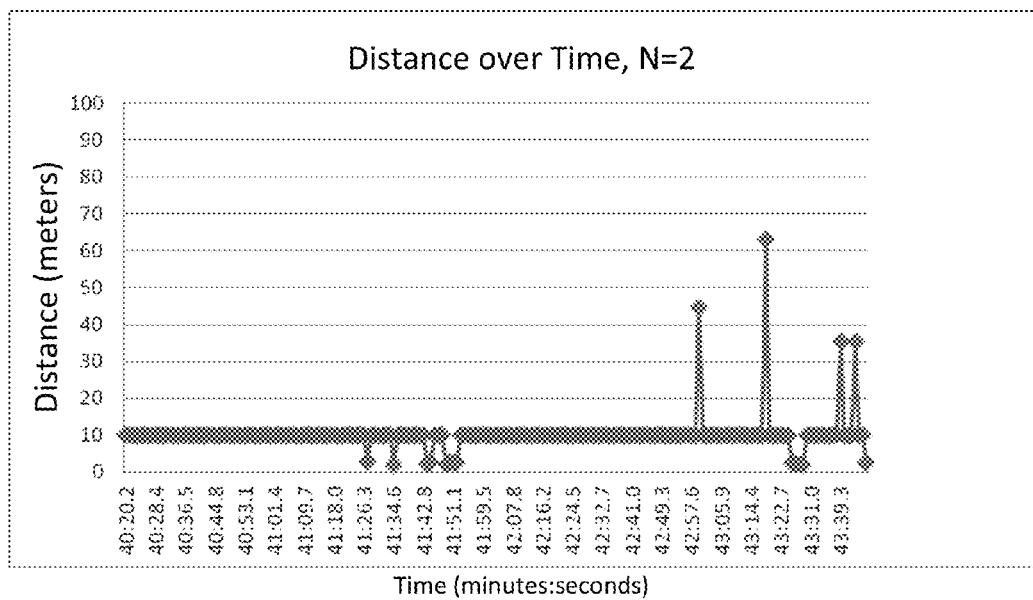
FIG. 4 is a simplified chart illustrating distances estimated between devices with a path-loss exponent value of 2.
Figure 5:
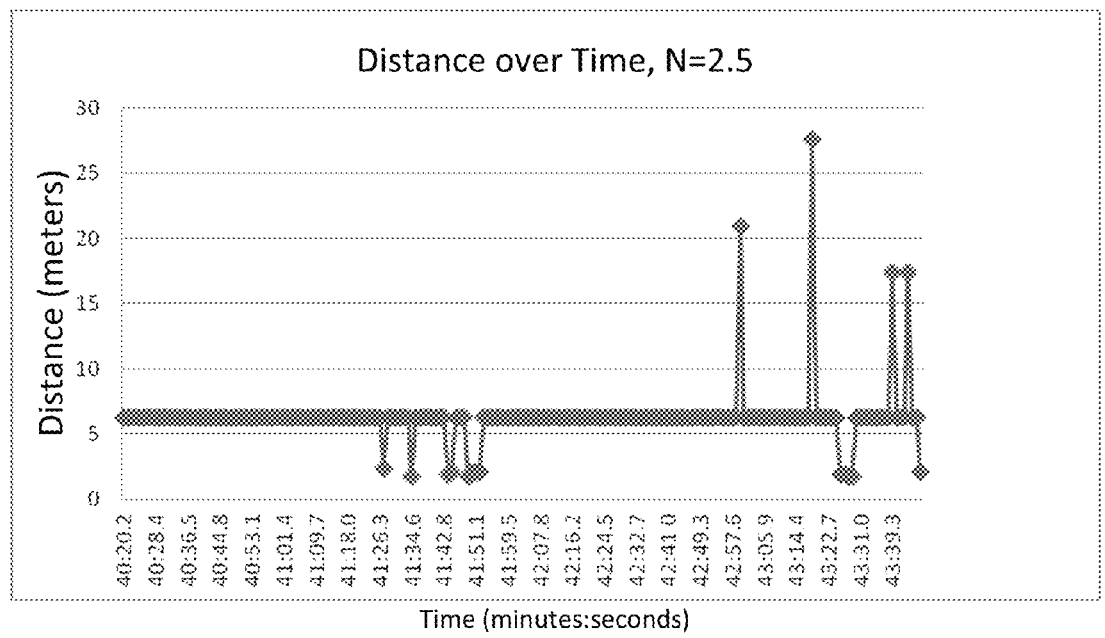
FIG. 5 is another simplified chart illustrating distances estimated between devices with a path-loss exponent value of 2.5.
Figure 6:
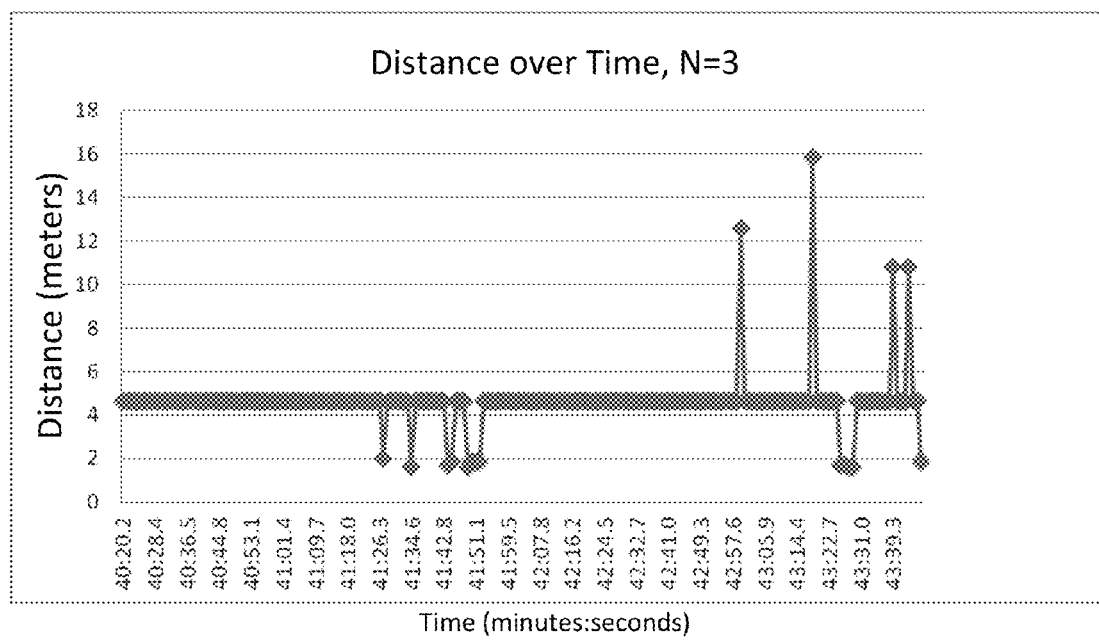
FIG. 6 is a simplified chart illustrating distances estimated between devices with a path-loss exponent value of 3.
Figure 7:
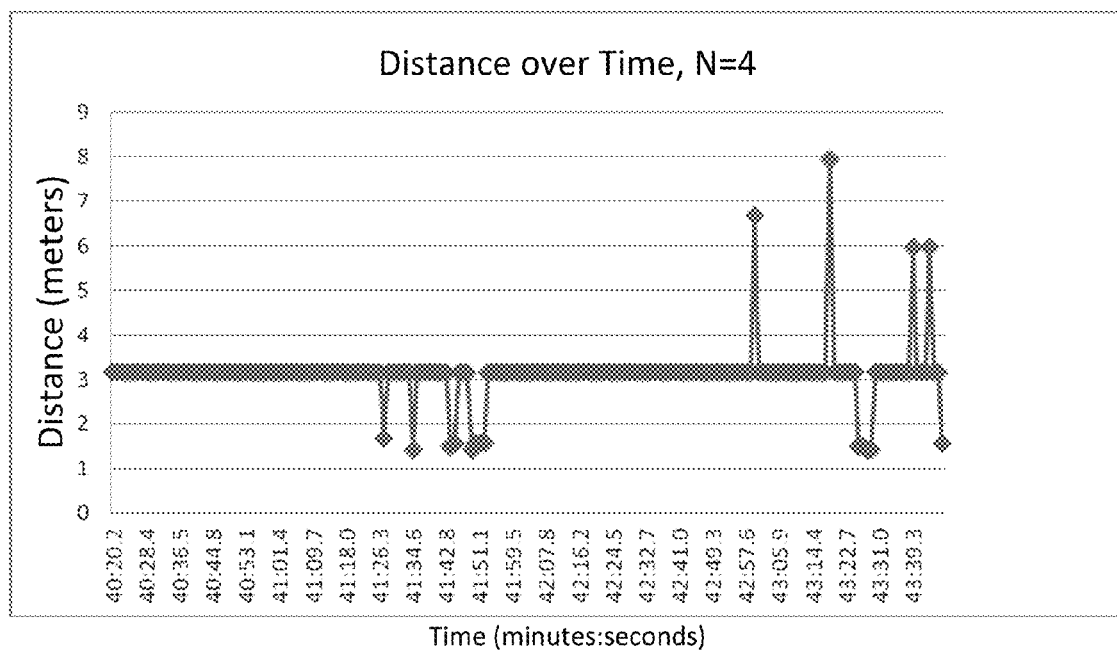
FIG. 7 is a simplified chart illustrating distances estimated between devices with a path-loss exponent value of 4.

Turning to FIG. 3, a process flow 300 illustrates one example of a method performed by the monitoring device 110, according to an embodiment. The monitoring device 110 starts the process flow 300 upon a predetermined schedule or interval, or in response to a signal or message. The signal or message in one example indicates a change in an RF measurement, sensor data, calendar information, email, or user profile. For example, a sudden drop in a Wi-Fi signal may indicate that the user 125 has left a predetermined location (e.g., the user's home) or another fixed location. Alternatively, a sudden drop in a GPS signal may indicate that the user has gone indoors.

The monitoring device 110 determines (302) a user context indicator. The monitoring device 110 determines (304) whether there has been a change in a user context indicator. In alternative implementations, the monitoring device 110 may determine whether a path-loss parameter should be changed based on the user context indicator. For example, where several user context indicators have changed or are inconsistent with each other, one or more of the changes or user context indicators may cancel another out. In this case, the monitoring device 110 combines corresponding parameter adjustments for the user context indicators. For example, if received signal strengths, relative to a stationary wireless network 160, for the monitoring device 110 and reporting device 120, respectively, indicate that the devices are not moving, the monitoring device 110 may cancel or reduce the parameter adjustment from an increase or other variation in path-loss. If no change in user context indicators has occurred (NO at 304), the process flow 300 ends.

If a change in one or more of the user context indicators has occurred (YES at 304), the monitoring device 110 updates (306) at least one path-loss parameter of the plurality of path-loss parameters. The monitoring device 110 receives (308) at least one wireless signal over the wireless communication link 130. The received wireless signal may be a wireless signal requested by the monitoring device 110 for purposes of determining the path-loss or a wireless signal sent for another purpose, such as a data transfer. The monitoring device 110 estimates (310) the path-loss between the monitoring device 110 and the reporting device 120 based on the plurality of path-loss parameters and the received wireless signal (or multiple wireless signals). The monitoring device 110 in one example estimates the path-loss repeatedly at the monitor interval, for example, every 200 milliseconds, every second, every three seconds, or other intervals.

While updating (306), receipt (308), and estimating (310) are shown as adjacent steps, the wireless signal may be received or the estimation performed at a later time or as part of separate process flows. In this case, the monitoring device 110 may update the path-loss parameters multiple times before using the path-loss parameters to estimate the path-loss. In one example, the monitoring device 110 resets at least one path-loss parameter to a default value upon a predetermined condition, such as an expiration of a user context timer or a change in a user context indicator.

As described above, the path-loss parameters include a path-loss exponent, an alert threshold, a monitor interval, and an alert type. The monitoring device 110 is configured to use one or more path-loss equations to estimate (310) the path-loss based on a received signal strength of the wireless signal (or multiple wireless signals) received in step 308. The monitoring device 110 may also filter, smooth, or average the estimation of the path-loss using another path-loss parameter (e.g., a filtering value) to reduce false proximity alerts due to transient or short-term conditions. In one example, the monitoring device 110 estimates the path-loss based on:

$$P_{RX} = P_{TX} - L_{path} - L_{fade} + G_{TX} + G_{RX}$$

where $P_{RX}$ is the power of the received wireless signal (e.g., received signal strength indication), $P_{TX}$ is a transmission power for the wireless signal, $L_{path}$ is the path-loss, $L_{fade}$ is a signal loss due to signal fading, $G_{TX}$ is a transmitter gain, and $G_{RX}$ is a receiver gain. One or more of the transmission power or transmitter gain may be received from the reporting device 120, for example, in a negotiation or maintenance message associated with the wireless communication link 130. In the case of Bluetooth for the wireless communication link 130, the monitoring device 110 may receive transmission power messages from the reporting device 120 that include the transmission power or transmitter gain.

The path-loss is given by $$L_{path} = 20 \cdot \log(4 \cdot \pi \cdot R/\lambda) \approx 40 + 20 \cdot \log(R)$$

where R is a distance to a transmitter of a wireless signal (e.g., the reporting device 120) and λ is a wavelength of the wireless signal.

An estimated distance to the reporting device 120 is given by $$d = 10^{\frac{(PL-40)}{10 \cdot n}}$$

where d is an estimated distance to the reporting device 120, PL is the estimated path-loss, and n is the path-loss exponent. The path-loss exponent is generally in the range of 2 to 4 or higher based on environmental factors, where approximate values are 2.0 for propagation in free space (e.g., line of sight or no obstructions to the signal), 2.5 for light obstructions (e.g., office cubicles), 3.0 for moderate obstructions (e.g., fixed walls), and 4.0 for heavy obstructions (e.g., dense construction materials). The monitoring device 110 in one example updates the path-loss exponent based on the location. For example, a parameter adjustment based on the location may include setting the path-loss exponent to 2.0 when located in a public park, 3.0 when in the user's home, and 4.0 for at the user's place of work. After estimation (310) of the path-loss, the monitoring device 110 optionally estimates (312) the distance to the reporting device 120, for example, based on the estimated path-loss and the path-loss exponent.

Upon estimation (310) of the path-loss, the monitoring device 110 in one example determines (314) whether the path-loss meets the alert threshold. In this case, the alert threshold is a path-loss threshold value that indicates that a proximity-triggered function should be performed. The monitoring device 110 uses a path-loss threshold value that corresponds to a distance between the monitoring device 110 and the reporting device 120. When using the path-loss threshold value, the monitoring device 110 selects the path-loss threshold value based on the path-loss exponent or other parameters. Alternatively, the path-loss threshold value may be predetermined.

Examples of the proximity-triggered function include locking one or both of the monitoring device 110 and reporting device 120, initiating an alert (e.g., an audible or visible notification) on one or both devices, or sending a message to the reporting device 120 or to another device (not shown). The monitoring device 110 in one example selects the proximity-triggered function based on the alert type. The monitoring device 110 triggers or executes a proximity-triggered function when the path-loss has met (e.g., become equal to or greater than) the path-loss threshold value. For example, a user of the monitoring device 110 may wish to be notified when the reporting device 120, worn by the user's child, has moved (or been moved) 5 meters away or farther from the monitoring device 110. In alternative implementations, the monitoring device 110 may trigger the proximity-triggered function when the path-loss has become less than the path-loss threshold value.

In another example where the monitoring device 110 determines the distance d, the monitoring device 110 determines (314) whether the distance d meets the alert threshold. In this case, the alert threshold is a distance threshold value (e.g., 1 meter, 4 meters, or other values) that indicates that the proximity-triggered function should be performed. The monitoring device 110 may use multiple alert thresholds (path-loss threshold values, distance threshold values, or combination thereof) corresponding to one or more proximity-triggered functions. If the alert threshold is not met (NO at 314), the process flow 300 ends. If the alert threshold is met (YES at 314), the monitoring device 110 performs (316) the proximity-triggered function and the process flow 300 ends.

Based on the user context indicators and corresponding parameter adjustments, the monitoring device 110 may help to reduce false proximity alerts and battery drain. In one example, the monitoring device 110 determines that the user 125 is at a predetermined location, such as their home, based on the current location. In this case, the parameter adjustments may correspond to setting the path-loss exponent to a value corresponding to their home, such as 2.5 (e.g., indoors with fixed walls), increasing the alert threshold to 20 meters, and setting the monitor interval to five seconds. In another example, the monitoring device 110 may determine that the user 125 has an upcoming appointment indicated in their calendar. In this case, the parameter adjustments may correspond to reducing the alert threshold by 10 meters and reducing the monitor interval by three seconds.

The monitoring device 110 in one example uses movement history of the user 125 as the user context indicator. In this case, the monitoring device 110 may use a prior history of walking along a common path, such as to an adjacent room or cubicle, to adjust the path-loss parameters. For example, the monitoring device 110 may increase the alert threshold by five meters to allow the user 125 to reach the adjacent cubicle without initiating an alarm. In another example, the monitoring device 110 uses an orientation and speed of both the monitoring device 110 and the reporting device 120. For example, if the monitoring device 110 is moving to the north, while the reporting device 120 is moving to the south, the monitoring device 110 may reduce the alert threshold to three meters and reduce the monitor interval to 200 milliseconds to allow for a prompt alert to the user 125.

In yet another example, the user context indicator is a user profile or other information associated with the user 125. For example, where the user profile is a Google ID, the monitoring device 110 may determine that the user 125 is currently following a travel route using public transportation (e.g., a bus or train) that they recently searched for with a map application. In this case, the monitoring device 110 may use a reduced alert threshold (e.g., 1 meter), reduced monitor interval (e.g., 0.5 seconds), and an easily recognized alert type (e.g., a function that plays a siren sound) while the user 125 is still on the travel route until they have reached their destination.

Another user context indicator is a state indicator for the monitoring device 110, such as whether the monitoring device 110 or reporting device 120 is stowed (e.g., in a pocket or bag). In this case, the monitoring device 110 may use a reduced monitor interval to reduce battery drain while the monitoring device 110 is stowed in combination with a close proximity and thus likely to be in the user's pocket.

Turning to FIG. 4, FIG. 5, FIG. 6, and FIG. 7, charts 400, 500, 600, and 700 illustrate example logs of estimated distance over time between two electronic devices for various values of the path-loss exponent. Charts 400, 500, 600, and 700 correspond to path-loss exponents of 2.0, 2.5, 3.0, and 4.0, respectively, for the same actual location of the electronic devices. As described above, the monitoring device 110 updates the path-loss exponent based on the user context indicators to reduce false proximity alerts.

It can be seen from the foregoing that methods and devices for estimation of path-loss or response to the path loss based on user context indicators have been described. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. On a first device, a method for estimating a path-loss between the first device and a second device, the method comprising:
    determining a user context indicator associated with the first device;
    updating at least one path-loss parameter of a plurality of path-loss parameters for the first device based on the user context indicator;
    receiving at least one wireless signal from the second device;
    estimating the path-loss between the first device and the second device based on the plurality of path-loss parameters and the at least one wireless signal,
        the plurality of path-loss parameters comprising a path-loss exponent, and
        the estimating the path-loss comprising estimating the path-loss repeatedly using the path-loss exponent; and
    performing a proximity-triggered function based on the estimated path-loss and an alert threshold.

2. The method of claim 1 wherein the plurality of path-loss parameters comprises a monitor interval, and
    wherein estimating the path-loss repeatedly is performed at the monitor interval using the path-loss exponent.

3. The method of claim 1 wherein performing the proximity-triggered function comprises:
    estimating a distance to the second device based on the estimated path-loss and the path-loss exponent;
    determining whether the estimated distance meets the alert threshold; and
    performing the proximity-triggered function if the estimated distance meets the alert threshold.

4. The method of claim 1 wherein the user context indicator corresponds to at least one parameter adjustment for a path-loss parameter; and
    wherein updating the at least one path-loss parameter comprises updating the path-loss parameter of the at least one path-loss parameter that corresponds to the user context indicator with the parameter adjustment.

5. The method of claim 4 wherein the user context indicator further comprises a movement speed associated with the first device, a movement type associated with the first device, an orientation of the first device, a movement history associated with the first device, a state indicator for the first device, sensor data of the first device, a user profile associated with the first device, calendar information associated with the first device, detection status of a stationary wireless network, received signal strength of a stationary wireless network, or a current proximity between the first and second devices.

6. The method of claim 4 wherein if a current location of the first device matches a predetermined location, the at least one parameter adjustment comprises at least one of an alert threshold increase or a predetermined path-loss exponent that corresponds to the predetermined location.

7. The method of claim 2 wherein the user context indicator corresponds to at least one parameter adjustment for a path-loss parameter, updating the at least one path-loss parameter comprises updating the path-loss parameter of the at least one path-loss parameter that corresponds to the user context indicator with the parameter adjustment, the user context indicator comprising a movement speed associated with the first device, a movement type associated with the first device, an orientation of the first device, a movement history associated with the first device, a state indicator for the first device, sensor data of the first device, a user profile associated with the first device, calendar information associated with the first device, detection status of a stationary wireless network, received signal strength of a stationary wireless network, or a current proximity between the first and second devices, wherein if the movement speed of the first device meets a movement threshold, the at least one parameter adjustment comprises a monitor interval reduction to the monitor interval.

8. The method of claim 5 wherein if the movement history indicates a previously traveled path, the at least one parameter adjustment comprises an alert threshold reduction.

9. The method of claim 2 wherein the user context indicator corresponds to at least one parameter adjustment for a path-loss parameter, updating the at least one path-loss parameter comprises updating the path-loss parameter of the at least one path-loss parameter that corresponds to the user context indicator with the parameter adjustment, the user context indicator comprising a movement speed associated with the first device, a movement type associated with the first device, an orientation of the first device, a movement history associated with the first device, a state indicator for the first device, sensor data of the first device, a user profile associated with the first device, calendar information associated with the first device, detection status of a stationary wireless network, received signal strength of a stationary wireless network, or a current proximity between the first and second devices, wherein if the calendar information indicates an upcoming calendar event, the at least one parameter adjustment comprises a monitor interval reduction to the monitor interval.

10. The method of claim 4 wherein determining the user context indicator comprises determining a plurality of user context indicators; and
    wherein updating the at least one path-loss parameter comprises:
        combining parameter adjustments of the plurality of user context indicators for a same path-loss parameter; and
        updating the path-loss parameter with the combined parameter adjustment.

11. The method of claim 4 wherein the user context indicator comprises a current location of the second device, a movement speed associated with the second device, a movement type associated with the second device, an orientation of the second device, a movement history associated with the second device, a state indicator for the second device, sensor data of the second device, a user profile associated with the second device, detection status of a stationary wireless network for the second device, received signal strength of a stationary wireless network for the second device, or calendar information associated with the second device.

12. The method of claim 4 wherein determining the user context indicator comprises:
    determining a first received signal strength of a stationary wireless network for the first device;
    receiving a second received signal strength of the stationary wireless network from the second device; and
    determining a relative movement between the first device and second device based on the first received signal strength and the second received signal strength.

13. The method of claim 1 further comprising resetting the at least one path-loss parameter to a default value upon a predetermined condition.

14. The method of claim 13 wherein the predetermined condition comprises an expiration of a user context timer or a change in the user context indicator.

15. A first electronic device comprising:
    a wireless transceiver;
    a non-transitory memory; and
    a processor configured to retrieve instructions from the memory;
    wherein the first electronic device is configured to:
        determine a user context indicator associated with the first electronic device;
        update at least one path-loss parameter of a plurality of path-loss parameters for the first electronic device based on the user context indicator;
        receive, via the wireless transceiver, at least one wireless signal from a second electronic device;
        estimate the path-loss between the first electronic device and the second electronic device based on the plurality of path-loss parameters and the at least one wireless signal,
            the plurality of path-loss parameters comprising a path-loss exponent, and
            the estimating the path-loss comprising estimating the path-loss repeatedly using the path-loss exponent; and
        performing a proximity-triggered function based on the estimated path-loss and an alert threshold.

16. The first electronic device of claim 15 wherein the plurality of path-loss parameters comprises a monitor interval; and
    wherein the first electronic device is configured to:
        estimate the path-loss repeatedly using the path-loss exponent at the monitor interval.

17. The first electronic device of claim 15 wherein the first electronic device is configured to:
    estimate a distance to the second electronic device based on the estimated path-loss and the path-loss exponent;
    determine whether the estimated distance meets the alert threshold; and
    perform the proximity-triggered function if the estimated distance meets the alert threshold.

18. The first electronic device of claim 15 wherein the user context indicator corresponds to at least one parameter adjustment for a path-loss parameter of the plurality of path-loss parameters; and
    wherein the first electronic device is configured to update a path-loss parameter of the at least one path-loss parameter with the parameter adjustment for the path-loss parameter.

19. The first electronic device of claim 18 wherein the user context indicator further comprises a movement speed associated with the first electronic device, a movement type associated with the first electronic device, an orientation of the first electronic device, a movement history associated with the first electronic device, a state indicator for the first electronic device, sensor data of the first electronic device, a user profile associated with the first electronic device, calendar information associated with the first electronic device, detection status of a stationary wireless network, received signal strength of the stationary wireless network, or a current proximity between the first and second electronic devices.

20. The first electronic device of claim 18 wherein the first electronic device is configured to:
    determine a plurality of user context indicators;
    combine parameter adjustments of the plurality of user context indicators for a same path-loss parameter; and update the path-loss parameter with the combined parameter adjustment.

21. The first electronic device of claim 15 wherein the first electronic device is configured to:
reset the at least one path-loss parameter to a default value upon a predetermined condition.

* * * * *